Jan. 3, 1967     D. B. GIBSON     3,295,854

DICTATION TRANSCRIBING MACHINE

Filed July 30, 1964     3 Sheets-Sheet 1

INVENTOR.
DONALD B. GIBSON

BY George H. Fritzinger

AGENT

Jan. 3, 1967 D. B. GIBSON 3,295,854

DICTATION TRANSCRIBING MACHINE

Filed July 30, 1964 3 Sheets-Sheet 2

INVENTOR.
DONALD B. GIBSON

BY George H. Fritzinger

AGENT

INVENTOR.
DONALD B. GIBSON

United States Patent Office 3,295,854
Patented Jan. 3, 1967

3,295,854
DICTATION TRANSCRIBING MACHINE
Donald B. Gibson, Passaic, N.J., assignor to McGraw-Edison Company, Elgin, Ill., a corporation of Delaware
Filed July 30, 1964, Ser. No. 386,229
8 Claims. (Cl. 274—21)

This invention relates to machines for reproducing dictation generally known as transcribing or secretarial machines. More particularly, the invention relates to an improved carriage control mechanism for selectively backspacing the head carriage either with a continuous movement to any desired extent or by discrete steps.

In transcribing dictation the secretary will at times backspace the head carriage through a relatively long distance—herein referred to as a scan operation—to listen back to a whole paragraph or to one or more sentences, and will ofttimes backspace the head carriage by one or more steps through a backstep operation only to pick up the last few words of the dictation last recorded.

An object of the present invention is to provide an improved backspace mechanism which when operated in a continous scan will move the head carriage by a distance which is an integral multiple of the step distance effected in a single backstep operation.

Another object is to provide such improved backspace mechanism which can move the head carriage by uniform steps after a scan operation as well as from any point of advance of the head carriage during transcribing.

Another object is to provide such improved backspacing mechanism which is efficient, dependable and economical to produce and to maintain.

These and other objects and features of the invention will be apparent from the following description and the appended claims.

In the description of the invention reference is had to the accompanying drawings, of which:

Figure 1:
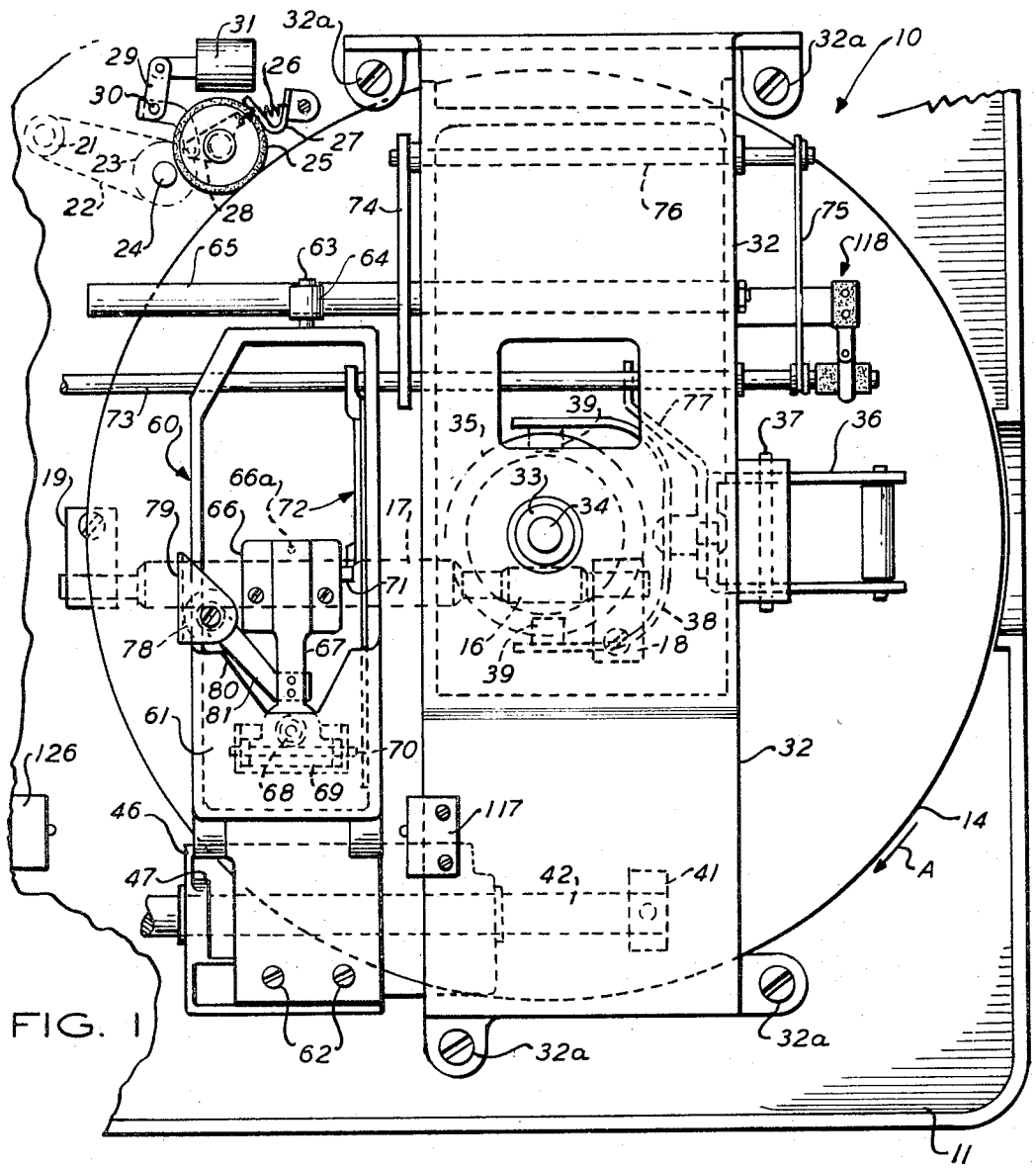
FIGURE 1 is a fractional top plan view of a reproducing machine in which my invention is incorporated.

The present invention is herein shown in connection with a phonographic reproducing machine adapted only for transcribing dictation. This machine includes a housing having upper and lower rectangular pan-shaped sections of which only a lower section 11 is fractionally shown in FIGURE 1. (For a detailed description of the housing and of other portions of the machine reference may be had to the Somers Patent No. 2,866,547, dated December 30, 1958.) The housing is substantially closed except for a wide horizontal slot along the right side for insertion and removal of disk records onto and from the turntable of the machine.

The lower housing section 11 serves as the frame of the machine and to this end is provided with an upstanding post 12 (FIGURE 2) on which is journaled a tubular shaft 13 of a turntable 14. The shaft carries a worm gear 15 which meshes with a worm wheel 16 on a feed screw 17. The feed screw is supported at its ends by bearings 18 and 19 upstanding from the frame section 11. The turntable is driven in the direction of the arrow A from a drive pulley 21 of a motor (not shown) through a belt 22 to a driven wheel 23 having a driving spindle 24 for engagement with an idler wheel 25. The idler wheel is urged by a tension spring 26 against the peripheral rim of the turntable 14 and against a brake shoe 27 for braking the turntable against movement. The idler wheel 25 is journalled to a link 28 which in turn is pivoted to a control lever 29 itself pivoted on a stud 30. The control lever is turned by a clutch solenoid 31 to move the idler wheel away from the brake shoe along the peripheral rim of the turntable into frictional driving engagement with the driving spindle.

Overlying the central portion of the turntable is a front-to-back extending bridge 32 having foot-like end portions seating on the lower housing section and secured thereto by screws 32a. On this bridge axially in line with the turntable is an interior bearing 33 rotatably receiving a plunger rod 34 which carries a record-clamping member 35 at its lower end. The plunger rod is movable upwardly and downwardly by a transversely extending U-shaped lever 36 which is pivoted at the right side of the bridge on a cross pin 37. Secured to the inner end of this U-shaped lever is a fork 38 having diammetrically opposite pins 39 which engage a peripheral groove in the record-clamping member 35.

The U-lever 36 is coupled to a door (not shown) which is hinged to the top section of the housing. This door may be opened to provide space for the fingers in mounting or removing a disk record onto and from the turntable 14. The coupling between the door and the U-lever 36 is such that the record clamping member is engaged and disengaged with respect to the turntable as the door is closed and opened.

On the front portion of the lower housing section 11 there is a pair of standards 41 supporting a cross rod 42. Also, at the central portion of the lower housing section there is a second pair of standards 43 only one of which is shown. The standards 43 support a cross rod 44 in parallel relation to the cross rod 42. Mounted slidably on these cross rods is a sub-carriage comprising a base plate 45 secured by screws 45a to a casting 46 having apertured lugs 47 which slidably embrace the cross rod 42. The base plate 45 has a rearward bifurcated portion 48 which slidably embraces the rear cross rod 44.

Figure 3:
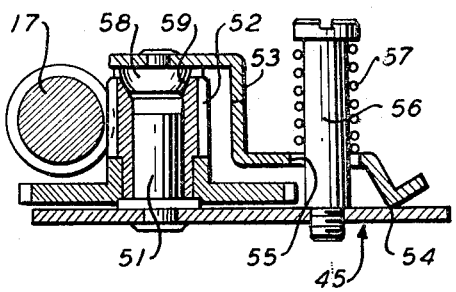
FIGURE 3 is a fractional sectional view on the line 3—3 of FIGURE 2.

Staked to the sub-carriage to the front of the feed screw 17 is a vertical stud pin 51 on which is journaled a circular feed nut 52 which meshes with the feed screw 17. Downward pressure is exerted on this feed nut by a lever 53 of a step-like form (see FIGURE 3) which is fulcrumed at 54 against the base plate 45 of the sub-carriage. The lower step portion of this lever has a clearance opening 55 through which passes a stud bolt 56 that is threaded into the base plate 45. On this stud bolt between the head thereof and the lever 53 there is a compression spring 57. The upper step portion of the lever 53 carries a hardened tapered pin 58 which under pressure of the spring 57 frictionally engages a central tapered opening 59 in the feed nut 52 to hold the feed nut frictionally from turning. The frictional restraint on the feed nut 52 is sufficient to cause the sub-carriage to be driven by the feed screw 17 but insufficient to prevent the feed nut 52 from being turned by a motive means to scan the head carriage across the disk record or to backspace it by steps for quick review as is later described.

An upper carriage arm 60 overlies the turntable and is secured to the sub-carriage to move in unison therewith. This carriage arm comprises a hollow rectangular casting 61 provided with a depending forward end portion beyond the turntable which is secured by screws 62 to the sub-carriage. Secured to the rearward wall of the carriage arm 60 is a stud 63 on which is journaled a roller 64. This roller rides on a horizontal cross rod 65 carried by and projecting leftwardly from the bridge 32.

In the forward portion of the carriage arm 60 is a reproducer head 66 having a record engaging stylus 66a at its rear or free end portion. Extending forwardly from the reproducer head is a support arm 67 which is pivoted on a vertical axis at 68 to a gimbal ring 69. The gimbal ring is in turn pivoted on a horizontal axis at 70 to the carriage arm 60. This mounting provides the reproducer head with a universal freedom of movement in both sidewise and vertical directions, the sidewise freedom being to allow the reproducer stylus to track a groove on the disk record and the vertical freedom being to permit the head to be lifted during a disk record exchange.

A lift mechanism for the reproducer head comprises a side pin 71 on the free end portion of the head and a lever mechanism 72 mounted on the inner wall of the carriage arm 60. This lever mechanism 72 has an arm overlying a lift rod 73 parallel to the path of the carriage. The lift rod 73 is mounted for up-and-down parallel movement on parallel arms 74 and 75 secured rigidly to the lift rod at one end and pivoted at 76 to the bridge 72 at the other end. The lift rod 73 is raised when the record clamp is disengaged by an arm 77 secured to the U-lever 36. As the lift rod 73 is so raised the reproducer head is raised also from the turntable through the lever mechanism 72.

Whenever the carriage is scanned across the record or backspaced by steps there is a tendency through the dragging of the reproducer head on the disk record to cause the reproducer head to be shifted sidewise from a centered position. In order to retain the reproducer head in a centered position during such carriage movement a centering electromagnet 78 is mounted on a bracket 79 itself secured to the left wall of the carriage arm 60. A centering armature 80 of the electromagnet is connected by an arm 81 to the reproducer head 66 so that when the centering electromagnet 78 is activated the reproducer head is shifted to and/or held at a centered position.

Figure 5:
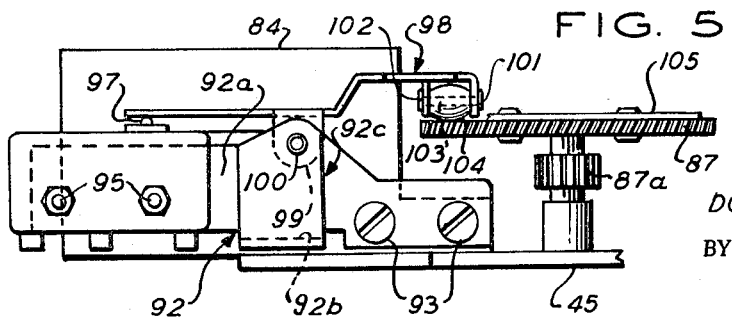
FIGURE 5 is a rear elevational view of the backspace stepping switch mechanism as seen from the line 5—5 of FIGURE 2.
Figure 2:
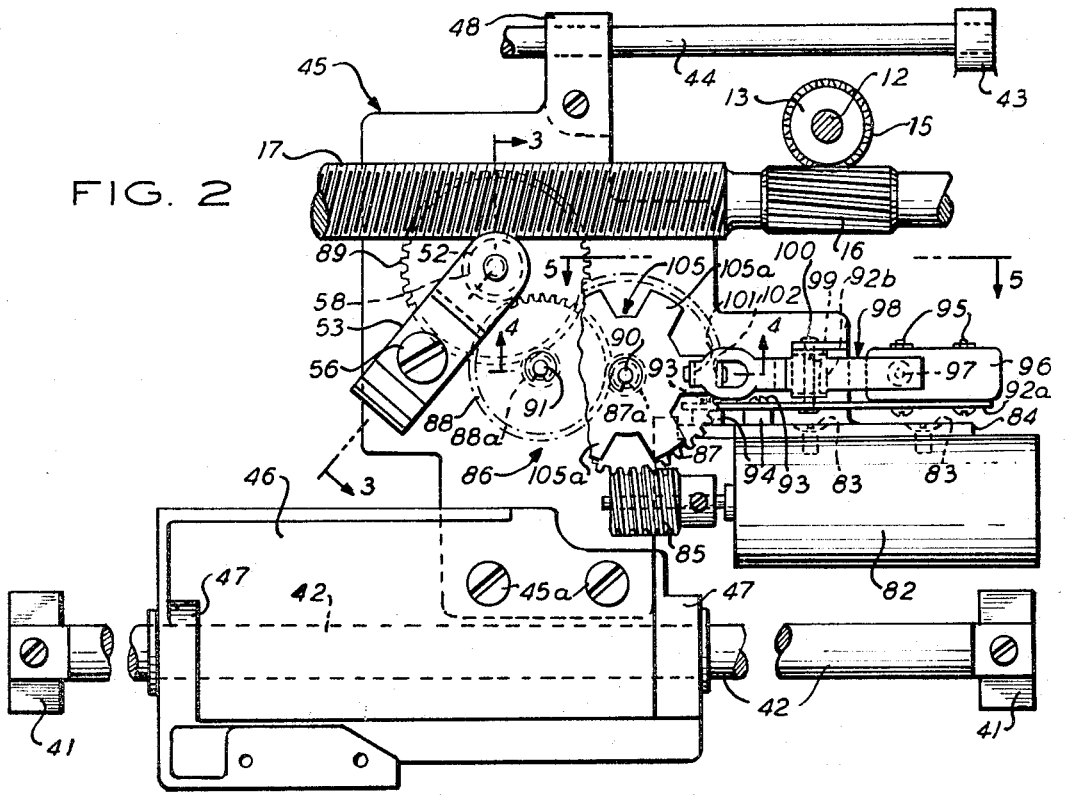
FIGURE 2 is a top plan view of the sub-carriage mechanism of the machine.
Figure 4:
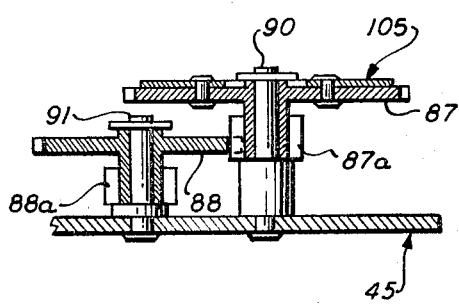
FIGURE 4 is a fractional sectional view on the line 4—4 of FIGURE 2.

The carriage scan and backspace mechanism for the present machine is shown in FIGURES 2, 4 and 5. This mechanism comprises a scan motor 82 secured as by screws 83 to a mounting flange 84 which is turned up from and extended sidewise of the base plate 45 of the subcarriage. Secured to the shaft of the scan motor is a worm gear 85 which is coupled through a step-down gear train 86 to the circular feed nut 52. This gear train comprises a first step gear 87 meshing with the worm 85 and having a pinion 87a. The pinion 87a meshes with a second step gear 88 having a pinion 88a. The pinion 88a in turn meshes with a gear 89 which is integral with the feed nut 52. The two stepped gears are journaled on respective studs 90 and 91 each staked to the base plate 45. The scan motor 82 is of a direct current reversible type which rotates in one direction or the other depending upon the polarity of the supply voltage. The motor may run typically at a speed of 3000 r.p.m. and the step-down ratio of the gear train 86 may be such that the carriage is scanned at a speed of ¼ in. per second. Being a reversible motor it can drive the carriage in either forward or reverse directions.

In spaced parallel relation to the mounting flange 84 of the scan motor is a switch mounting bracket 92. This bracket is secured by screws 93 through respective spacer blocks 94 to the flange 84. The bracket 92 comprises a side plate 92a having a side arm 92b midway its length which is bent across and then upwardly to provide the bracket with a central U-shaped portion 92c. The right end portion of the side plate 92a as it is seen in FIGURE 2 is apertured to receive two mounting bolts 95 for a microswitch 96. This microswitch is mounted with its push button 97 at its uppermost side. This is a stepping switch for the backspace mechanism as will later appear. This switch is shifted back and forth by the scan motor 82 through a rocker 98 having one end portion overlying the gear 87 and the other end portion overlying the push button 97. The central portion of the rocker has two turned-down ears 99 apertured to receive a cross pin 100 carried by the U-shaped portion 92c of the switch mounting bracket 92. The end portion of the rocker 98 overlying the gear 87 has two apertured lugs 101 and 102 spaced lengthwise of the rocker and turned downwardly therefrom. These lugs carry a pin 103 on which is journaled a bead-like roller 104. This roller rides on the top face of the gear 87. However, mounted on the top face of the gear is a spider wheel 105 having six equally spaced spokes 105a. As the gear 87 is turned by the scan motor the rocker is reciprocated by the roller 104 riding onto and off from the successive spokes to intermittently shift the microswitch 96 back and forth between its two positions. The width of the spokes is such that when the gear 87 is driven at a uniform speed the switch 96 will be shifted back and forth at a uniform rate.

Figure 6:
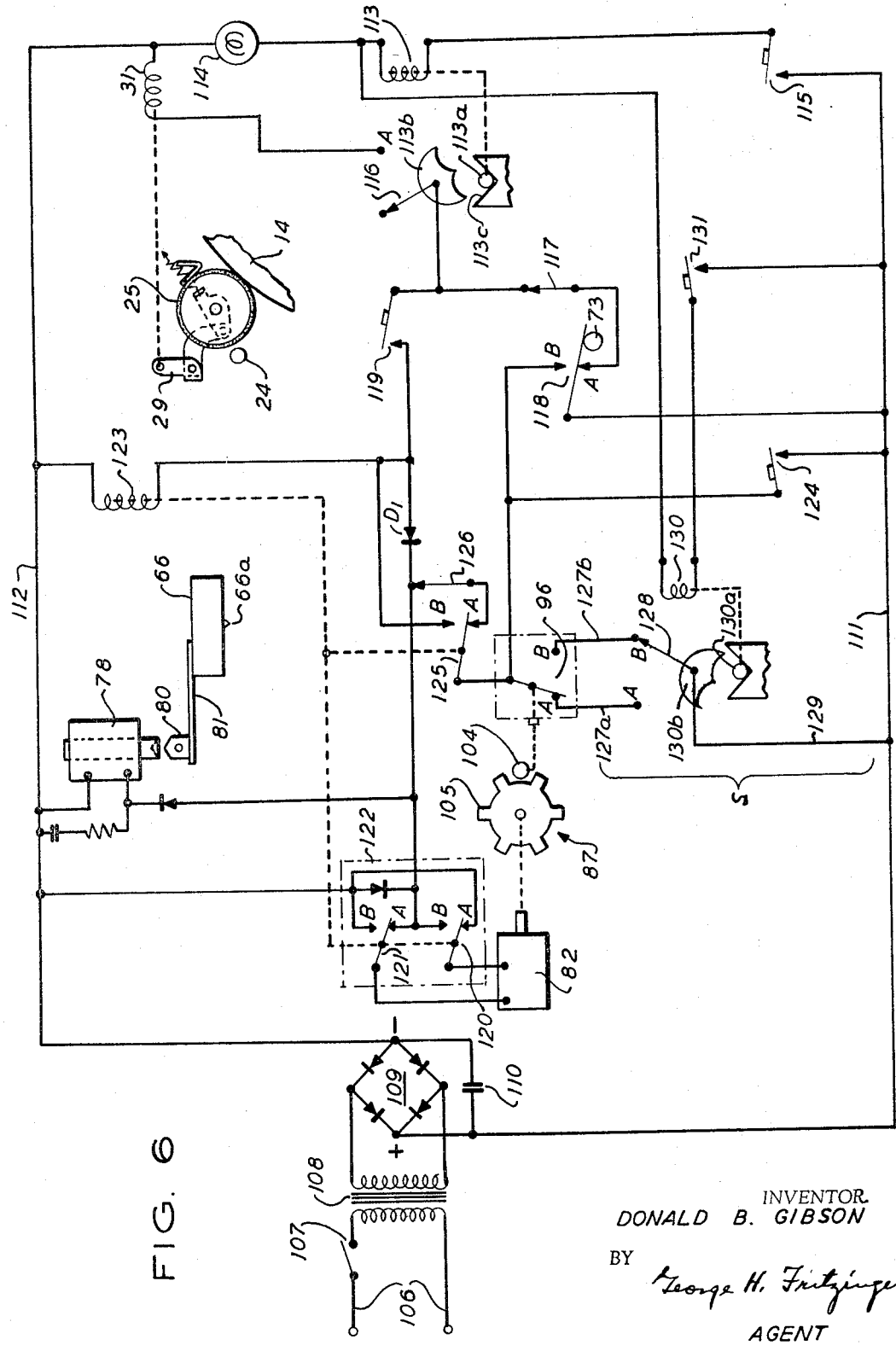
FIGURE 6 is a schematic diagram of the backspace control circuits.

The machine obtains its electrical power as from a 110 volt 60 cycle line indicated at 106 (FIGURE 6) through an on-off switch 107, an isolating transformer 108 and a rectifier 109. The D.C. output from the rectifier is filtered by a condenser 110. Connected to the filtered D.C. supply is a plus line 111 and a negative line 112 between which are connected the various electrical components of the machine. One of these components is a clutch relay 113 connected between the lines 111 and 112 via a current limiting lamp 114 and a start-stop push button switch 115. The clutch 113 is of the alternating type which shifts a switch 116 back and forth between its two positions responsive to successive activations of the relay coil. For instance, as is diagrammatically indicated in FIGURE 6, when the relay coil is energized it lifts an armature member 113a against one side of an over-centering cam 113b to shift the switch 116 to closed position, and upon releasing the start-stop switch 115 to break the line to the relay coil the armature member 113b drops into a V notch 113c to a centered position. Upon again pressing the switch 115 closed the armature member 113a is propelled upwardly against the other side of the over-centering cam 113b to shift the switch 116 to open position, and upon releasing the switch 115 the armature member 113b again falls to its centered position, etc.

The clutch solenoid 31 is connected from the negative line 112 via a contact A of the clutch relay switch 116, a normally closed forward-end carriage switch 117 mounted for example on the bridge 32 as shown in FIGURE 1, a contact A of a disk exchange switch 118 bracketed to the right side of the bridge 32 and controlled by the lift rod 73 so that it is closed with its A contact when the disk record is clamped to the turntable and to its B contact when the record clamp is released, and plus line 111. Thus, upon a press-release of the start-stop switch 115 the clutch is engaged to start the turntable and upon a next press-release of the switch 115 the clutch is disengaged, etc. However, if the lift rod 73 should be raised to change a record and shift the switch 118 to its B contact, or if the carriage should reach its forward end of travel to open the end switch 117, the drive clutch solenoid 31 cannot be activated to start the turntable.

A manual forward-scan switch 119 is provided which when pressed closed completes a circuit through the scan motor 82 from the plus line 111 to the negative line 112 through a circuit including contact A of the disk exchange switch 118, the carriage end switch 117, the forward-scan switch 119, diode D₁, poles 120 and 121 of a reversing switch 122, and the scan motor 82. At the same time that the scan motor 82 is started a reversing relay 123 is activated direct from the forward-scan switch 119 to the negative line 112. Activation of the reversing relay 123 shifts the poles 120 and 121 of the reversing switch 122 to their B contacts causing current to flow through the scan motor 82 in a direction to drive the carriage in a forward direction. Also, a centering electromagnet 78 is activated direct from the forward-scan switch 119 through the diode D₁ to the negative line 112 to cause the reproducer head to be maintained in a centered postion during the forward-scan operation. Upon release of the forward-scan switch 119 the reversing relay is restored to return the switch poles 120 and 121 to their A contacts, which are the positions for driving the scan motor in a reverse direction.

A manual back-scan switch 124 is provided which when pressed closed completes a circuit for the scan motor 82 from the plus line 111 through contact A of a switch 125 constituting a third switch of the reversing relay 123, a carriage back-limit switch 126 and the A contacts of the reversing switch 122—since the reversing relay 123 is now blocked by the diode $D_1$—to cause the scan motor 82 to run in a reverse direction. Also, the centering electromagnet 78 is again activated to keep the reproducer head centered during the back scan-operation.

Whenever the record clamp is released the switch 118 is shifted to its B contact to shunt the back-scan switch 124 and cause the scan motor 82 to run in a reverse direction until the carriage back-limit switch 126 is opened. Thus, the same operation occurs when the record clamp is released as when the back-scan switch 124 is held closed.

A circuit S is provided which is connected in shunt with the manual back-scan switch 124. This shunt circuit runs from the pole member of the microswitch 96 via either its A or B contacts, respective parallel branches 127a and 127b, respective A or B contacts of a switch 128, and lead wire 129 to plus line 111. The switch 128 is part of an alternating relay 130 of the same type as the relay 113 hereinbefore described. The relay 130 is activated from the plus line 111 through a manual backspace switch 131 and the current limiting lamp 114 to the negative line 112. Thus, upon successive press-release operations of the manual backspace switch 131, the switch 128 is shifted back and forth between its A and B contacts.

During both forward scan and back scan the microswitch 96—which is of an overcenter type—is shifted back and forth between its A and B contacts by the roller 104 riding onto and off the successive spokes of the spider 105. Since the microswitch 96 is shifted back and forth at a uniform rate as before described, the carriage is driven by fixed distances or steps between successive alternations of the switch 96. If at the instant the forward-scan switch 119 or the back-scan switch 124 is released, the shunt circuit S is closed by reason of the microswitch 96 and the alternating switch 128 both making with their A or B contacts, the forward or backward scan will be continued momentarily until the microswitch 96 is driven to its other contact. During such last moment of forward scan the reversing relay 123 is kept activated to maintain the forward direction of the scan motor by the switch pole 125 of the reversing relay 122 making with its B contact to provide an activating circuit for the reversing relay through the shunt circuit S after the forward-scan switch 119 is released. Thus, each forward scan or backward scan is by a distance which is an integral mutiple of the step distances the carriage is moved between successive alternations of the microswitch 96.

Each time the backspace switch 131 is closed the switch 128 is thrown from the position it then occupies to its other position. Since at the end of every scan operation the switch 96 is stopped out of phase from the switch 128 to leave the shunt circuit S open, the shift of the alternating switch 128 responsive to pressing the backspace switch 131 will activate the scan motor only for the duration required to shift the microswitch 96 to its other position. Since the diode $D_1$ blocks activation of the reversing relay 123 via the shunt circuit S, this step movement of the carirage will be in a backward direction. Thus, upon each press-release of the backspace switch 131 the carriage is backspaced by a uniform step. The backspacing is not influenced by the start-stop operation of the machine by the switch 115 since the scan motor 82 then remains at standstill. Further, each backspace step responsive to operating the backspace switch 131 is uniform regardless of whether the carriage had been last previously driven in a back-scan or forward-scan direction since each such long scan operation results in the carriage being driven a multiple times of a backstep distance.

The embodiment of my invention herein particularly shown and described is intended to be illustrative and not necessarily limitative of my invention since the same is subject to changes and modifications without departure from the scope of my invention which I endeavor to express according to the following claims.

I claim:
1. In a dictation transcribing machine including a support for a record medium, a reproduce head, a drive motor and means operable by said drive motor for rotating said record support and advancing said head: a mechanism for selectively backspacing said head by discrete steps including a scan motor, a power circuit for said scan motor and a switching system in said power circuit comprising two parallel lines and two single-pole double-throw alternating switches for completing said power circuit alternately via said two parallel lines, a manual backspace control successively operable for shifting one of said alternating switches back and forth between its two positions, and cam means operable by said scan motor for shifting the other of said alternating switches back and forth between its two positions respectively as said head is moved by said successive steps whereby upon each operation of said manual backspace control said head is backspaced by one of said steps.

2. The dictation transcribing machine set forth in claim 1 including a manually closable back-scan switch connected across said switching system for running said scan motor continuously while said back-scan switch is held closed, with said switching system keeping said scan motor running momentarily after said back-scan switch is released upon said back-scan switch being released when said switching system is closed.

3. The dictation transcribing machine set forth in claim 1 including an electromagnetic device coupled to said one alternating switch for shifting the switch back and forth responsive to successive activations of said device, and wherein said backspace control comprises a single-pole single-throw push switch connected in circuit with said electromagnetic device to activate the device once upon each depression of said push switch.

4. The dictation transcribing machine set forth in claim 1 wherein said scan motor is of the reversible type, including a carriage for said reproduce head, a feed screw rotatable by said drive motor, a rotary feed nut on said carriage engaging said feed screw, means mounting said scan motor on said carriage, means coupling said scan motor to said rotary feed nut for turning the latter, and a reversing switch in said scan motor circuit for selectively advancing or backspacing said head by rotation of said feed nut.

5. The dictation transcribing machine set forth in claim 4 wherein the coupling means between said scan motor and feed nut includes a gear train, and wherein said cam means comprises a series of equally spaced ridges on a face of a gear of said train and a cam follower riding on said face for opearting said other alternating switch.

6. In a dictation transcribing machine including a support for a record medium, a reproduce head, a drive motor, and means operable by said drive motor for rotating said record support and advancing said head: a backspace mechanism for said head including a reversible scan motor, means coupling said scan motor to said head to back scan and forward scan said head across said record medium as said motor is driven in reverse and forward directions, a power circuit for said scan motor including a reversing relay normally positioned in a back-scan position, a back-scan push switch in said power circuit for completing said power circuit to drive said motor in a reverse direction, a forward-scan push switch connected in said circuit for activating said reversing relay and supplying power to said scan motor to drive the motor in a forward direction, and an intermittent circuit connected in shunt with said push switch and operated by said scan motor in timed relation to the scan movement of said head for assuring when either of said push switches is released that said head is driven a scan distance from its start position which is an integral multiple of the distance of movement of said head in the interval between successive interruptions of said intermittent circuit.

7. The dictation transcribing machine set forth in claim 6 including a switch controlled by said reversing relay for providing an activating circuit for said reversing relay via said intermittent shunt circuit after said forward-scan push switch is released.

8. A drive and scan mechanism for a dictation transcribing machine having a rotatable support for a grooved record medium and a relatively movable carriage for a cooperating reproducer head, comprising a feed screw, a circular feed nut rotatably mounted on said carriage and engaging said feed screw, means frictionally restraining said feed nut from turning to cause the carriage to be advanced progressively as said feed screw is turned, a reversible scan motor mounted on said carriage and geared to said feed nut to turn the feed nut against the restraining force of said friction means whereby to produce a scan movement of said reproducer head across said supported record medium, a forward-scan switch operable to run said scan motor in a forward direction, a back-scan switch operable to run said scan motor in a reverse direction, and intermittent operating circuits synchronized with the scan movement of said head carriage for providing an intermittent drive current to said scan motor independent of said forward-scan and back-scan switches, and a backspace circuit for running said scan motor in a reverse direction via said intermittent operating circuit including a manual backspace control and a switch means responsive to said backspace control for completing said intermittent circuit only for the duration between successive interruptions thereof.

References Cited by the Examiner

UNITED STATES PATENTS 2,691,529  10/1954  Skoog  274—21

NORTON ANSHER, *Primary Examiner.*

C. B. PRICE, *Assistant Examiner.*